US008285839B2

(12) United States Patent  (10) Patent No.: US 8,285,839 B2
Butterfield et al.  (45) Date of Patent: Oct. 9, 2012

(54) URGENT COMMUNICATIONS THAT OVERCOME RECEIVING DEVICE IMPEDIMENTS

(75) Inventors: Daniel J. Butterfield, Flower Mound, TX (US); Tsz S. Cheng, Grand Prairie, TX (US); Gregory P. Fitzpatrick, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 12/395,910

(22) Filed: Mar. 2, 2009

(65) Prior Publication Data

US 2010/0222084 A1 Sep. 2, 2010

(51) Int. Cl.
*G06F 15/173* (2006.01)

(52) U.S. Cl. ........ 709/224; 709/202; 709/204; 709/205; 709/238; 709/239

(58) Field of Classification Search .................. 709/202, 709/204–205, 224, 238–239
See application file for complete search history.

(56) References Cited

U.S. PATENT DOCUMENTS

| 5,845,207 | A | 12/1998 | Amin et al. |
| 6,404,860 | B1 | 6/2002 | Casellini et al. |
| 6,408,187 | B1 | 6/2002 | Merriam |
| 6,421,437 | B1 | 7/2002 | Slutsman |
| 6,438,393 | B1 | 8/2002 | Suuronen |
| 6,741,688 | B1 | 5/2004 | Yau |
| 7,089,041 | B2 | 8/2006 | Huang |
| 7,130,664 | B1 | 10/2006 | Williams |
| 7,260,205 | B1 | 8/2007 | Murphy et al. |
| 7,319,744 | B1 | 1/2008 | Arnold |
| 7,953,398 | B2 * | 5/2011 | Shim et al. ............... 455/417 |
| 2003/0033394 | A1 | 2/2003 | Stine |
| 2003/0138085 | A1 | 7/2003 | Forman |
| 2005/0286705 | A1 | 12/2005 | Contolini et al. |
| 2006/0077956 | A1 | 4/2006 | Saksena et al. |
| 2006/0077957 | A1 | 4/2006 | Reddy |
| 2006/0093118 | A1 | 5/2006 | Agrawal et al. |
| 2006/0135138 | A1 | 6/2006 | Lazaridis et al. |
| 2006/0202819 | A1 * | 9/2006 | Adamczyk et al. ...... 340/539.18 |
| 2007/0037605 | A1 * | 2/2007 | Logan ...................... 455/567 |

(Continued)

FOREIGN PATENT DOCUMENTS

EP 1777916 A1 4/2007

OTHER PUBLICATIONS

Chavez et al.—U.S. Appl. No. 12/115,649, Non Final Office Action dated Aug. 9, 2011.

(Continued)

*Primary Examiner* — Liangche A Wang
(74) *Attorney, Agent, or Firm* — Patents On Demand P.A.; Brian K. Buchheit; Scott M. Garrett

(57) ABSTRACT

A communication attempt directed towards a recipient device can be identified. At least one proximate device geographically proximate to the recipient device can be automatically detected. Responsive to the determining of the proximate devices, a digitally encoded message can be wirelessly conveyed to one or more of the determined proximate devices. In various embodiments the message can be a text message, an instant message, and/or a voice message. The digitally encoded message can direct a user of the proximate device to inform a user of the recipient device of the communication attempt.

13 Claims, 4 Drawing Sheets

U.S. PATENT DOCUMENTS

| | | |
|---|---|---|
| 2007/0232277 A1 | 10/2007 | Spalink et al. |
| 2007/0287438 A1 | 12/2007 | Hansen et al. |
| 2008/0004009 A1 | 1/2008 | Caldwell |
| 2008/0112554 A1 | 5/2008 | Arnold |
| 2008/0130554 A1 | 6/2008 | Gisby et al. |
| 2009/0023427 A1 | 1/2009 | Kahn et al. |
| 2009/0086947 A1 | 4/2009 | Vendrow et al. |
| 2009/0279677 A1 | 11/2009 | Chavez |
| 2009/0279680 A1 | 11/2009 | Chavez |
| 2009/0280785 A1* | 11/2009 | Chavez et al. ................ 455/415 |
| 2009/0280787 A1 | 11/2009 | Chavez |
| 2009/0280817 A1* | 11/2009 | Chavez et al. ................ 455/445 |
| 2009/0280818 A1 | 11/2009 | Chavez |
| 2010/0009665 A1* | 1/2010 | Hawkins et al. ............. 455/417 |

OTHER PUBLICATIONS

Chavez et al.—U.S. Appl. No. 12/115,659, Non Final Office Action dated Aug. 9, 2011.

Chavez et al.—U.S. Appl. No. 12/115,663, Non Final Office Action dated Aug. 4, 2011.

U.S. Appl. No. 12/115,654, "Method and System for Performing Recipient Based Routing of a Phone Call", Non Final Office Action dated Jun. 28, 2011.

* cited by examiner

URGENT COMMUNICATIONS THAT OVERCOME RECEIVING DEVICE IMPEDIMENTS

BACKGROUND

The present invention relates to the field of communications, more particularly to urgent communications that overcome receiving device impediments.

Mobile communication devices have become ubiquitous in modern society. It is largely assumed that individuals may be reached instantly, anywhere at any time. This assumption is somewhat flawed, as multiple situations exist in which a communication recipient is for one reason or another not immediately apprised of a communication attempt. This type of situation can be generally categorized as situations where a communication impediment exists.

Attempt impediments can include a recipient's device being in a silent ring state, such as a vibrate mode. Another impediment can exist where a recipient's device is set to a relatively low volume and/or subtle ringtone which is unable to be heard due to ambient noise and/or to the device being concealed (e.g., in a purse, pocket, glove box, etc.) in a manner that muffles a ring.

When a communication recipient (e.g., a callee) is not successfully reached, callers are currently limited to leaving a voice mail, an IM message, a text message, and the like. These mechanisms can be less than ideal when a communication is urgent and requires an immediate response, since a relatively substantial delay can occur before a recipient consumes a message and responds to it.

BRIEF SUMMARY

In one embodiment, a communication attempt by a communicator directed towards a recipient device can be identified. An impediment to the communication attempt can be detected. Responsive to detecting the impediment, an adjustment action can be initiated that is designed to overcome the impediment. A notification can be presented subsequent to completion of the adjustment action.

In another embodiment, a mobile communication device can include a network transceiver, a personal area network transceiver, and a computer program product able to be executed by the mobile communication device. The network transceiver can be configured to wirelessly communicate with a communication system. The personal area network transceiver can be configured to wirelessly communicate with proximate devices. The computer program product, when executed, can cause the mobile communication device to detect proximate devices within range of the personal area network and to convey messages of incoming communication attempts to at least one of the detected proximate devices over the personal area network. The incoming communication attempts can require use of the network transceiver. The messages can indicate that a sender is attempting unsuccessfully to communicate with a user of the mobile communication device and can prompt a recipient of the message to inform the user of the incoming communication attempt.

DETAILED DESCRIPTION

Figure 1:
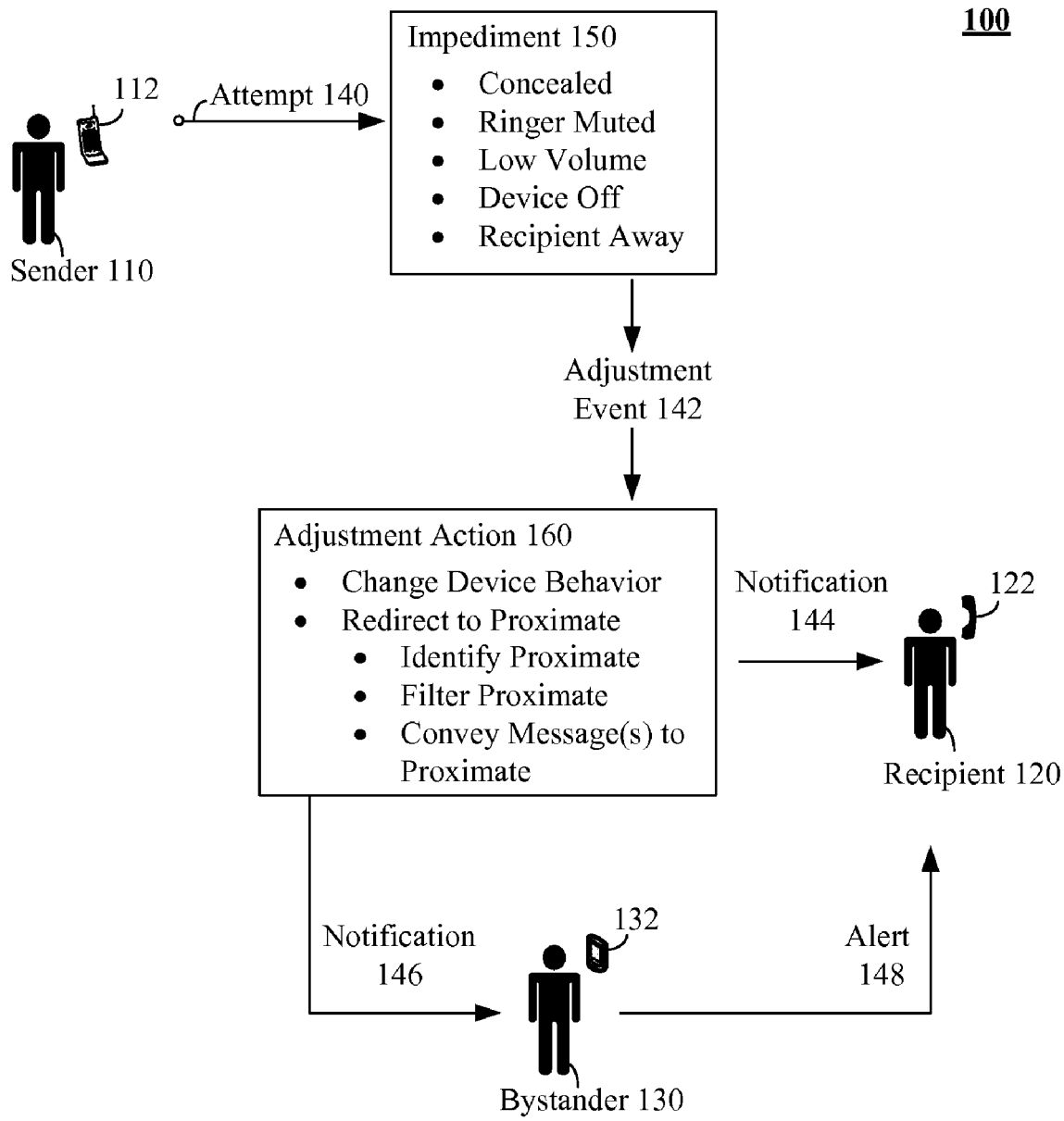
FIG. 1 is a diagram showing a communication which overcomes a receiving device impediment to ensure a recipient is notified of a communication attempt in accordance with an embodiment of the inventive arrangements disclosed herein.

The present disclosure teaches a method, system, and apparatus that overcomes receiving device impediments for urgent communications. In one embodiment, when an urgent call is attempted changes can be made that affect behavior of a recipient (e.g., callee) device. For example, a ring state, ring tone, ring volume, and the like can be adjusted to ensure a recipient is notified of a communication attempt. This change can be situational and dependent upon one or more programmatically detectable conditions, such as a recipient's device being concealed in a manner that may muffle device produced sounds.

In one embodiment, urgent communications directed towards a recipient can trigger an event that identifies communication devices proximate to a recipient's device. The communication can be redirected to one or more of these proximate devices. Alternatively, a message can be conveyed to a proximate device, which indicates that an urgent communication attempt is being made to contact the recipient. It is presumed that an owner of the proximate device can then inform the recipient of the urgent communication attempt. In one embodiment, only those proximate devices included in a contact list of the recipient's device will be contacted.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a diagram 100 showing a communication which overcomes a receiving device impediment to ensure a recipient 120 is notified of a communication attempt 140 in accordance with an embodiment of the inventive arrangements disclosed herein.

In diagram 110, a sender uses a communication device 112 to communicate with a communication device 122 of a recipient 120. The communication can be a real-time bidirectional communication, such as a telephony communication, a two-way radio communication, an Instant Messaging (IM) communication, a Short Message Service (SMS) message, and the like. The sender 110 can be required to know an identifier (e.g., phone number, IM user name, URL, etc.) of the recipients device 122 when initiating a communication attempt 140.

This attempt 140 can be hampered by one or more impediments 150. An impediment 150 can represent any circumstance that prevents the recipient 120 from being notified (notification 144) of the attempt 140. For example, an impediment 150 can include the receiving device 122 being in a concealed state, which can muffle an audible ringing that prevents the recipient 120 from hearing an audible notification 144. Other impediments 150 can include the ringer state of the device 122 being muted, being set to a low volume, or the device 122 being off. Still another impediment 150 can include a recipient 120 being away from his/her device 122 and/or the device 122 being located in an environment with significant ambient noise, either of which can make a notification 144 is hard for a recipient 120 to hear.

In one embodiment, impediments 150 can be detected using one or more sensors. For example, device 122 can include a light sensor, where darkness detected by the light sensor is indicative of the device 122 being concealed. In another example, device 122 can include a motion sensor, which is able to detect motions indicative of a vehicle moving, which can be one impediment 150 that makes notifications of a communication attempt 140 more difficult for a recipient 120 to respond to.

Upon detecting the impediment 150, an adjustment event 142 can fire, which initiates an adjustment action 160. Adjustment actions 160 can execute within the recipient device 122, within a communication system that facilitates communications between sender 110 and recipient 120, and/or within a network element communicatively linked to the recipient device 122. Adjustment actions 160 can change device 122 behavior and/or can redirect a communication attempt to a proximate device 132.

Changing device 122 behavior can include changing a ringer setting, a ringer volume, a ringtone, and the like to make a notification 144 more prominent. If device 122 is concealed, for example, an increased prominence of an audible notification 144 can alert the recipient 120 of an incoming communication attempt, even if he/she would likely overlook the notification if presented at default settings. The change in device behavior is not limited to audible characteristics, and can include visual notifications (lights/screen flashing), vibrations, and the like.

A number of different adjustment actions 160 are encompassed by redirecting an attempt 140 to a proximate device. In one embodiment, a set of devices proximate to device 122 can be identified. This identification can occur using a personal area networking (PAN) of device 122 to interrogate a set of nearby devices that are able to receive PAN communications. The BLUETOOTH protocol, for example, permits a device 122 to identity all BLUETOOTH devices within BLUETOOTH range. In another embodiment, proximity can be based upon absolute coordinates rather than relative coordinates. For example, a communication provider can receive GPS data (cell based triangulation data, or other presence data) from a set of devices 122, 132 and can use this data to determine if the devices are proximate (within a predefined range) of one another. The proximate devices can be optionally filtered. For example, a filter can be based upon contact information contained within a contact list logically associated with the recipient's device 122. The contact information can be co-located with the recipient device 122 (e.g., stored within a physical data store of the device 122) or contained within a data store accessible by a network element facilitating communication with the device 122 (e.g., stored in a wireless service provider's network).

Once a list of proximate devices is determined, a message can be conveyed to each of these devices. That is, a notification 146 can be sent to devices 132 of one or more bystander 130. Notification 146 can be sent from the recipient device 122 (e.g., via the PAN) and/or can be conveyed to the bystander device 132 through a service provider network. This provider network can be a wireless (mobile telephony)

network, a land based network (POTS), an internet protocol network (Internet, Intranet), and the like.

The notification 146 can be a redirection of the communication attempt 140 and/or can be a customized message (audible, text, video, etc.). The notification 146 can indicate that a sender 110 has an urgent desire to communicate with the recipient 120, who is proximate to the bystander 130. The notification 146 can request the bystander 130 alert 148 the recipient 120 of this communication attempt 140. The alerting 148 can include a physical person-to-person contact.

In one embodiment, the notification 146 can be conducted in an environmentally aware fashion. For example, when an environment has a pre-existing customer notification point (e.g., customer service desk), this can be considered a desired locus for providing the notification 146. Many situations (e.g., conference hall, meeting room, movie theatre, etc.) where recipients 120 typically mute and/or subdue ringing of their device 122 have a front desk or the equivalent, which is able to contact (alert 148 after receiving notification 146) a recipient 120 in urgent situations.

In one embodiment, the device 132 can be an ancillary presentation device, where the notification 146 and alerting 148 can be automated and/or may not involve a bystander 130. For example, device 132 can include a sound system external to device 122, which can be conveyed notification 146 and present alert 148. For instance, the sound system can include an in-vehicle stereo system (BLUETOOTH enabled or otherwise linked to device 122), which is able to provide a more prominent alert 148 than the recipient's devices 122. In another embodiment, the device 132 can include a conferencing system of a meeting room, which can flash (e.g., visually present within a popup of a graphical user interface (GUI)) an alert 148 to specific recipients 120 responsive to receiving the notification 146.

Figure 2:
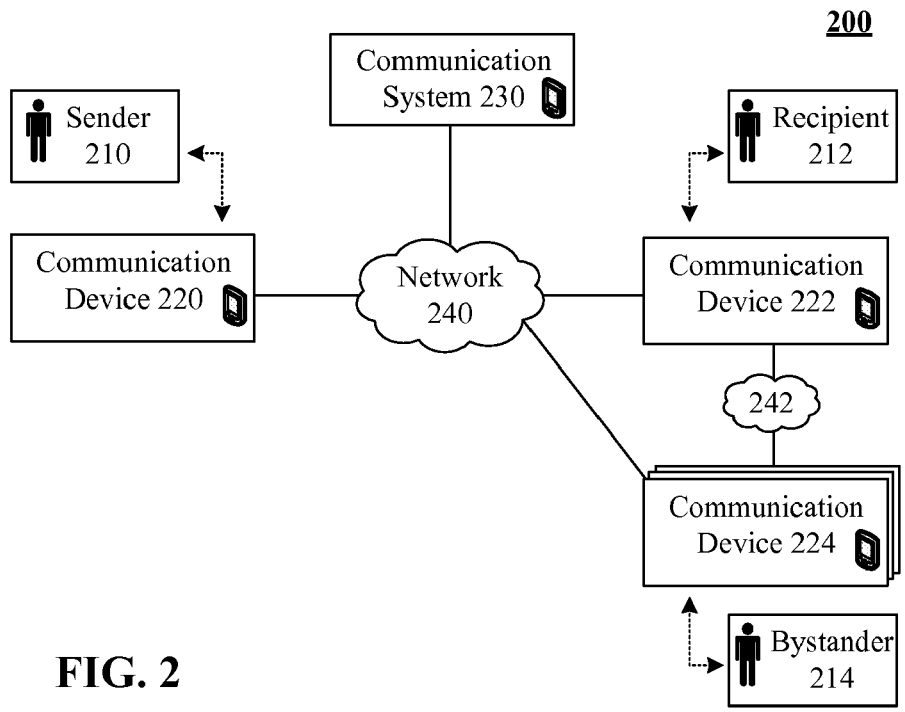
FIG. 2 is a schematic diagram of a system configured to detect and overcome impediments to communication attempts in accordance with an embodiment of the inventive arrangements disclosed herein.

FIG. 2 is a schematic diagram of a system 200 configured to detect and overcome impediments to communication attempts in accordance with an embodiment of the inventive arrangements disclosed herein. System 200 can be one contemplated system able to perform the actions elaborated upon in diagram 100.

In system 100, a set of communication devices 220, 222, 224 can be connected to each other via a network 240. A communication system 230 can optionally be communicatively linked to the network 240, which can facilitate communications among devices 220-224. The devices 220-224 can be associated with different communicators 210-224, which include sender 210, recipient 212, and bystander 214. In one embodiment, when a sender 210 is unable to communicate with a recipient 212, one or more bystanders 214 proximate to the recipient 212 can be notified via their communication device 224 so that the proximate bystander 224 can alert the recipient 212. In another embodiment, when a sender 210 attempts to communicate with device 222, behavior of the device 222 (or proximate device 224) can be automatically adjusted to increase a prominence of the notification to recipient 212. In one embodiment, a local network 242 (e.g., a PAN) can facilitate communications between devices 222 and 224.

Network 240 can include any hardware/software/and firmware necessary to convey digital content encoded within carrier waves. Content can be contained within analog or digital signals and conveyed through data or voice channels and can be conveyed over a wide area network (WAN), a Metropolitan area network (MAN), a PAN, an ad hoc network, and the like. The network 240 can include local components and data pathways necessary for communications to be exchanged among computing device components and between integrated device components and peripheral devices. The network 240 can also include network equipment, such as routers, data lines, hubs, and intermediary servers which together form a packet-based network, such as the Internet or an intranet. The network 240 can further include circuit-based communication components and mobile communication components, such as telephony switches, modems, cellular communication towers, and the like. The network 240 can include line based and/or wireless communication pathways.

Network 242 can be a personal area network 242 able to convey digitally encoded content between device 222 and 224 within carrier waves. The network 242 can be designed for direct device-to-device communications in accordance with a standardized protocol, such as BLUETOOTH, WIRELESS USB, ZIGBEE, and the like. Network 242 can also include WIFI, WIMAX, and any of the 802.11 family of protocols. In one embodiment, devices 222, 224 can interrogate each other, which facilitates presence detection within a given range.

Communication system 230 can include one or more service provider systems. The system 230 can include components needed for a mobile and/or other telephony network 240. System 230 can further be a two-way radio system and/or a set of servers that facilitate push-to-talk (PTT) communications (e.g., Push to Talk over Cellular (PoC), IDEN based PTT, etc.). The communication system 230 can also include one or more Short Message Service (SMS) server, Instant Messaging (IM) server, chat server, Voice over Internet Protocol (VOIP) server, Session Initiation Protocol (SIP) server, media streaming server, Web server, email server, and the like. Communications exchanged between devices 220-224 (and systems 230 facilitating these communications) are not limited to a single type and/or protocol. For example, an initial communication attempt from the sender 210 to the recipient 212 can be a phone call, but a SMS message can be sent to devices 224 of bystanders 214 in attempt to notify recipient 212 of an incoming communication attempt.

The communication system 230 can include services and/or programmatic functions able to perform dynamic conversion (in real time) between one communication type and other. For example, system 230 can utilize text-to-speech, speech-to-text, and other technologies to dynamically convert communications from one form to another. In one embodiment, dynamic translations from one language to another and/or from one communication idiom to another (e.g., from English to IM acronyms, etc) can also optionally occur. Further, speech can be converted to dynamically create Web documents (e.g., XML, HTML, etc.) that can be expressed within a Web browser as a notification. In one embodiment, one or more functions attributable to system 230 can be implemented as a service, such as a Web service.

Communication device 220-224 can include any combination of hardware/software/firmware able to function as a communication interface for sender 210, recipient 212, and/or bystander 214. The communication devices 220-224 can include customer premise equipment (CPE), mobile phones, Web tables, personal data assistants, personal computers, and the like. The different capabilities of the devices 220-224 can be taken into consideration when conveying digitally encoded content to the devices 220-224.

Although not shown, each of the devices 220-224 and system 230 can include one or more data stores, which are able to retain or store digitally encoded information. Each of the data stores can be physically implemented within any type of hardware including, but not limited to, a magnetic disk, an optical disk, a semiconductor memory, a digitally encoded plastic memory, or any other recording medium. Each data store can be a stand-alone storage unit as well as a storage unit formed from a plurality of physical devices. Additionally, information can be stored within a data store in a variety of manners. For example, information can be stored within a database structure or can be stored within one or more files of a file storage system, where each file may or may not be indexed for information searching purposes. Further, each data store can optionally utilize one or more encryption mechanisms to protect stored information from unauthorized access.

Figure 3:
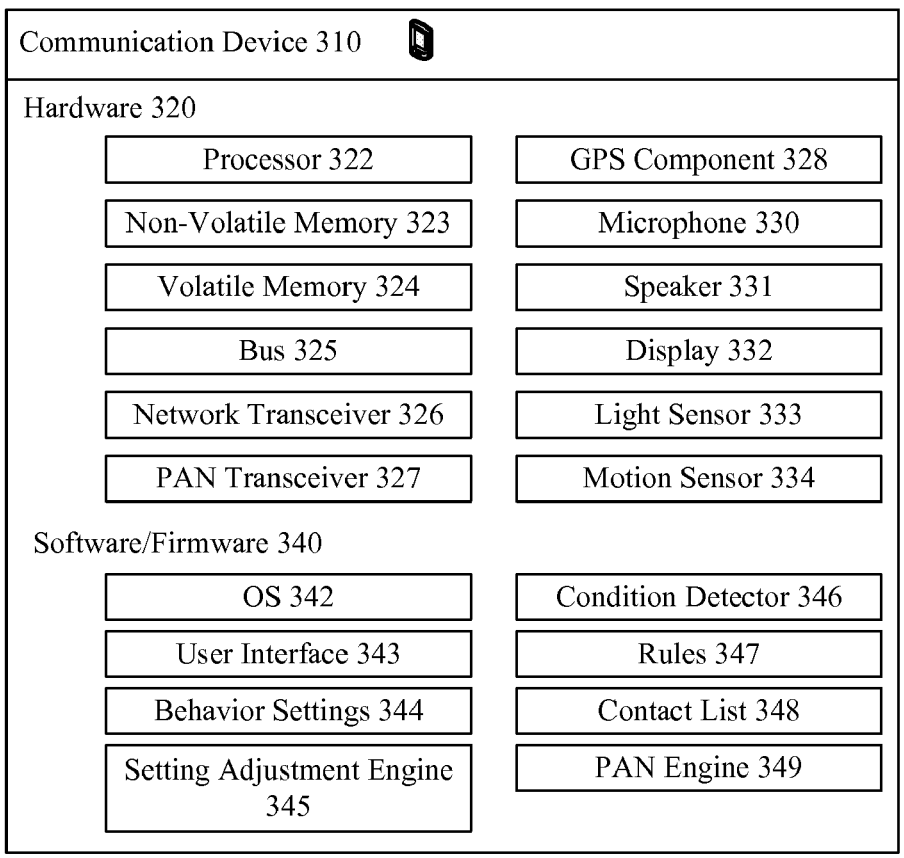
FIG. 3 is a schematic diagram of a computing device which is able to participate in communications where adjustment actions execute to overcome impediments in accordance with an embodiment of the inventive arrangements disclosed herein.

FIG. 3 is a schematic diagram of a computing device 310 which is able to participate in communications where adjustment actions execute to overcome impediments in accordance with an embodiment of the inventive arrangements disclosed herein. In one embodiment, computing device 310 can be a recipient's communication device (e.g., device 122 or 222) and/or a communication device of a communication sender or bystander (e.g., device 112, 132, 220, or 214). Device 310 can include a variety of different types of premise equipment (CPE), such as mobile telephones, land-line phones, VOIP phones, WIFI phones, softphones and associated hardware executing the softphone software, text-messaging devices, and other personal computing devices with communication capabilities, and the like. Device 310 is shown for illustrative purposes and not all implementations of a communication device compatible with the inventive arrangements disclosed herein include components expressed for device 310.

As shown, the communication device 310 can include hardware 320 and software/firmware components 340. The hardware 320 can include a processor 322, non-volatile memory 323, volatile memory 324, network transceiver 326, PAN transceiver 327, GPS component 328, microphone 330, speaker 331, display 332, light sensor 333, motion sensor 334, and/or other component, which are electronically coupled via bus 325. The microphone 330 and speaker 331 are optional components used for voice-based communications. The display 332 can be used to present a Text User Interface (TUI) or a graphical user interface (GUI).

Although not shown, input components (e.g., a keypad, keyboard, thumb pad, etc.) can be included and/or can be coupled to device hardware 320 and used for text entry. Network transceiver 326 can be a component used for communication over a wide area network (e.g., a telephony network or an IP based network), while the PAN transceiver 327 can be used for local wireless communications, such as BLUETOOTH communications, WIFI communications, ZIGBEE communications, WIRELESS USB communications, and the like. The GPS component 328 is an optional component, which can be used to determine an absolute position of device 310, which can be useful to ascertain what devices are proximately located to device 310. Other embodiments can use PAN transceiver 327 to determine proximate devices based upon those devices present within a transmission range of the PAN transceiver 327. Other presence components and/or presence detection systems are contemplated (e.g., an intra-device Radio Frequency Identification (RFID) tag readable by a set of RFID scanners can be used to triangulate a position of device 310 for purposes of determining devices proximate to device 310).

Light sensor 333 and motion sensor 334 are two possible sensors useful in determining whether device 310 is suffering from an impediment. For example, when the light sensor 333 indicates that the device 310 is in a dark space, it can be assumed that the device 310 is contained in a purse, pocket, glove box, etc., which can muffle an audible notice so that a recipient cannot hear it easily. The motion sensor 334 can include an accelerometer, a gravimeter, a gyroscope, and the other such component. The motion sensor 334 can be used to determine whether device 310 is positioned in an active environment, which is likely to hamper an ability of a recipient to acknowledge a standard incoming communication attempt. In one embodiment, input from sensors 333, 334 can be constructively combined with other input (e.g., ambient noise level from microphone 333, environmental data based upon GPS 328 position and/or data received via PAN transceiver 327 from nearby computing devices, etc.) to greatly improve an accuracy of impediment detection and a determination of appropriate adjustment actions over using input from a single sensor alone.

The software/firmware 340 can be stored in memory 323 and/or 324 and can execute upon the hardware 320. Software/firmware 340 can include any computer program product including a set of programmatic instructions which are able to be read, interpreted, and/or executed by a machine (e.g., computing device 310). Software/firmware 340 can include an operating system (OS) 342, a user interface 343, behavior settings 344, setting adjustment engine 345, condition detector 346, rules 347, contact list 348, PAN engine 349, and/or other such computer program product components.

The condition detector 364 includes the programmatic instructions for detecting an impediment. This detection can be based upon input from one or more sensor 333, 334. In one embodiment, the condition detector 364 can include a condition that is based upon a delay period (no-response after X number of rings).

The setting adjustment action 345 can include programmatic instructions for modifying one or more behavior setting 344 of device 310 to overcome an impediment. These adjustments by engine 345 can be based upon a set of previously defined rules 347, which can optionally be configured by a user of device 310.

One of the adjustments can involve using PAN engine 349 to detect a set of devices within range of device 310. The PAN engine 349 can establish a direct communication between device 310 and one or more proximate devices. Engine 349 can also receive and convey messages from and to devices in PAN range.

The contact list 348 can be a list utilized to maintain names, contact numbers, email addresses, IM identities, and the like. The contact list 348 can be a single list or can include multiple different lists. The lists may include an incoming contact list, and outgoing contact list, a communication history, a user entered and maintained list, and the like.

Although contact list 348 is shown as being stored internally in a storage medium of the communication device 310, other embodiments are contemplated. For example, in one embodiment, the contact list 348 can be stored in a network data store in a fashion that is logically associated with the device 310 (e.g., a service provider network can include a data store indexing device 310 against a device specific contact list 348). Use of a network data store is advantageous in that contact information stored in a network data store is accessible even when the logically associated device 310 is turned off, is out of communication range, or is otherwise communicatively unavailable. Thus, filters can be applied based upon information contained in a contact list 348 even when the device 310 itself is inaccessible.

Figure 4A:
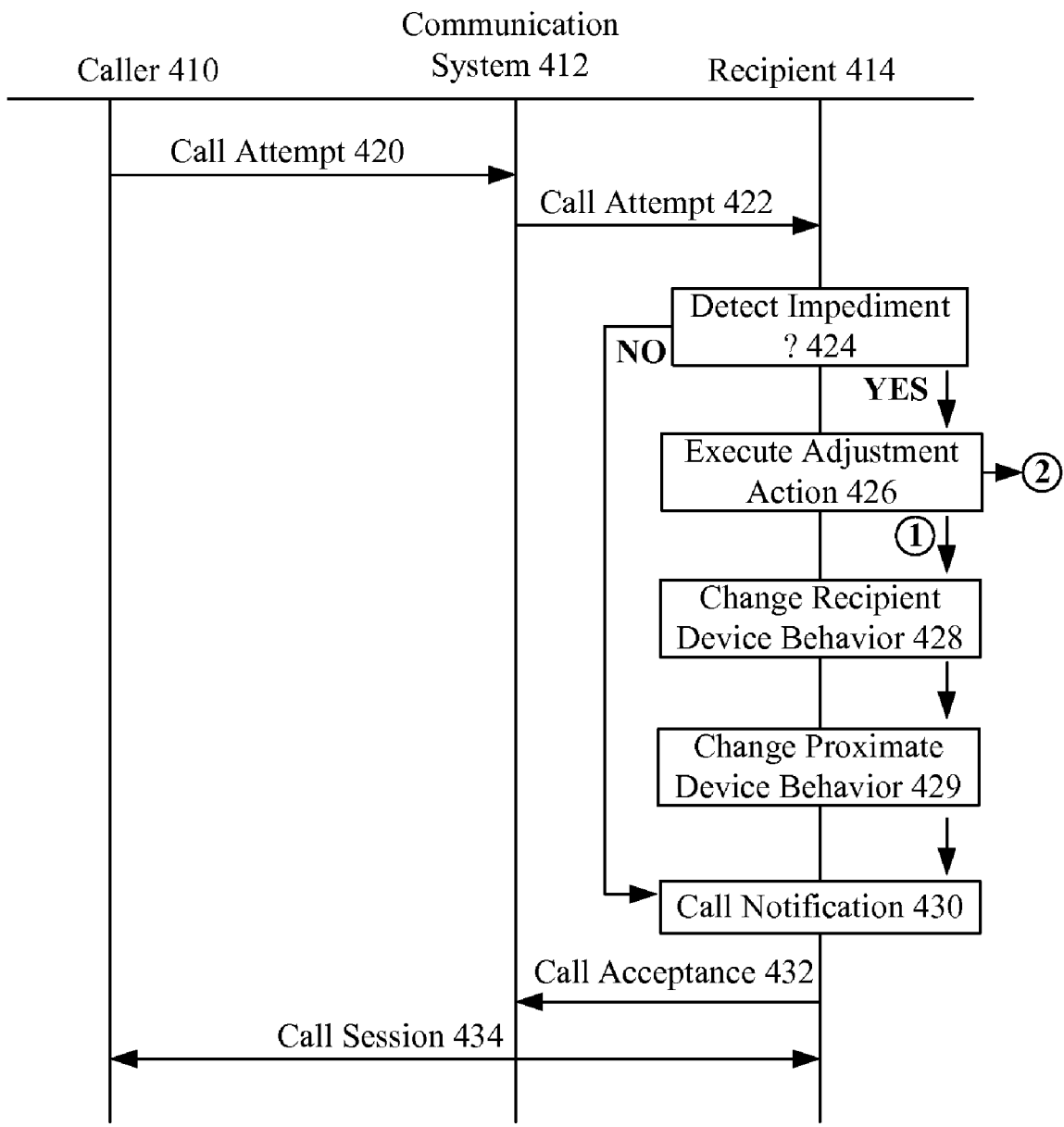
FIGS. 4A and 4B are flow diagrams showing a communication involving at least a caller and a recipient where impediments are detected and overcome through an adjustment action in accordance with an embodiment of the inventive arrangements disclosed herein.
Figure 4B:
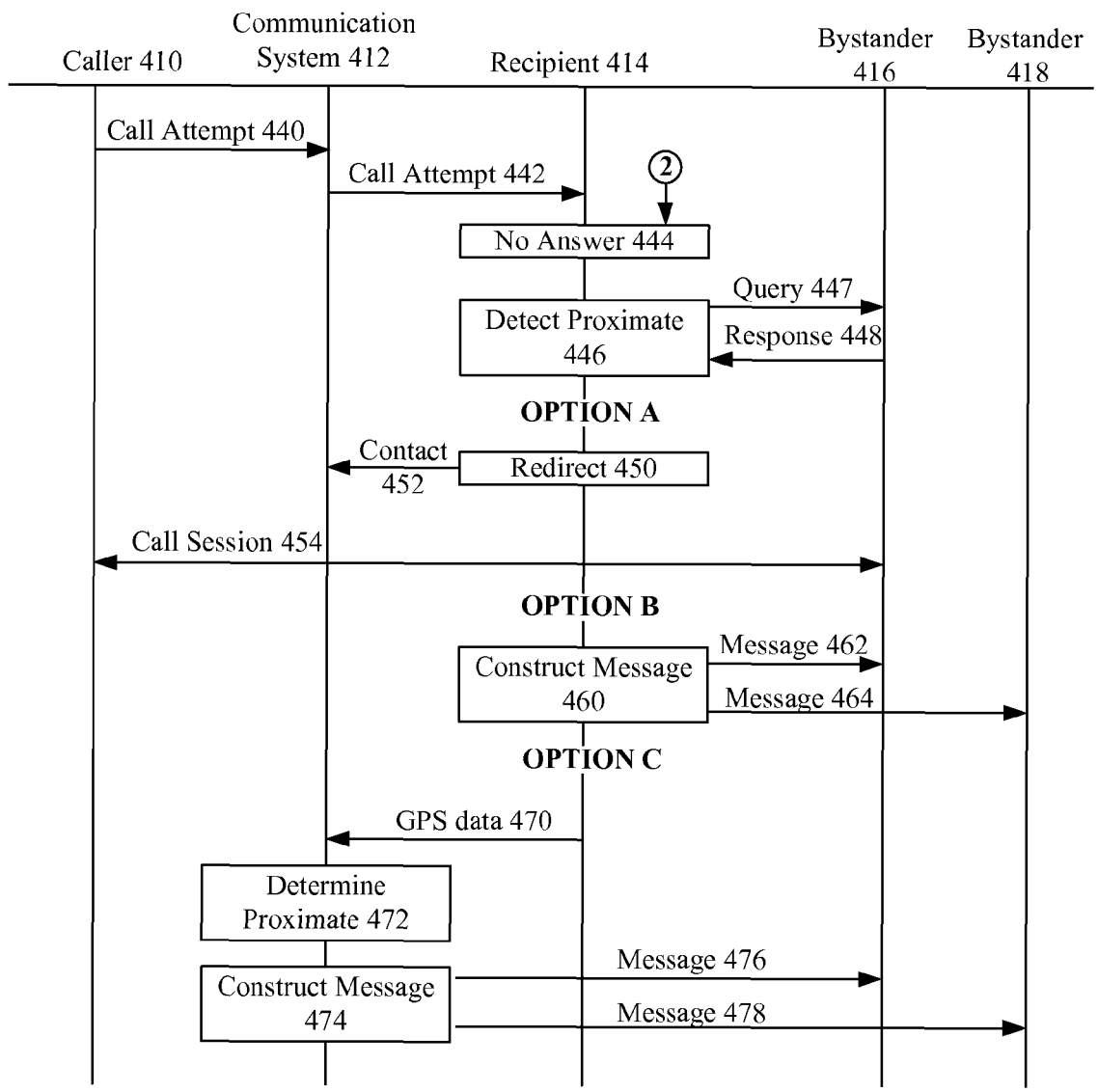

FIGS. 4A and 4B are flow diagrams showing a communication involving at least a caller 410 and a recipient 414 where impediments are detected and overcome through an adjustment action in accordance with an embodiment of the inventive arrangements disclosed herein. In FIGS. 4A and 4B, messages are exchanged among caller 410, communication system 412, recipient 414, bystander 416, and/or bystander 418.

In one arrangement, a call attempt 420 can be conveyed from caller 410 to communication system 412. The call attempt 420 can refer to a telephony call or some other communication (e.g., IM, SMS text exchange, etc.). System 412 connects to recipient 414 and conveys call attempt 422. At this point, the recipient's device 414 can possibly detect an impediment, as shown by step 424. When an impediment is detected, an adjustment action 426 can execute, which is designed to compensate for the impediment. The adjustment action can change device behavior (steps 428 or 429) and/or can result in alternative and proximate devices being contacted (steps starting at 444 of FIG. 4B).

In step 428, a change in recipient device behavior can occur. This change can adjust a ring (or other phone characteristic) characteristic to make an audible (visual, vibration, or other sensual) notification more noticeable by the recipient 414. In one embodiment, a proximate device to the recipient 414 can have its behavior modified, as noted by step 429. For example, a proximate audio/video system can be used to present a notification to the recipient. The proximate devices can also include mobile devices carried by others. This can be, for example, useful when the impediment is that the recipient's device is off, as a proximate device can provide the incoming call notification (possibly with a recipient specific/characteristic ringtone) that the powered-off recipient's phone is unable to provide. Call notification 430 can be presented after the optional behavioral adjustments (steps 428, 429) are made.

In response to the notification 430, the recipient 414 can opt to accept the call 432, which results in an establishment of a call session 434 between the caller 410 and recipient 414.

A different type of adjustment for an impediment involves one or more bystanders 416, 418. Again, a caller 410 can initiate a call attempt 440. A communication system 412 can relay the attempt 442 to recipient 414. A previously specified duration (e.g., number of rings) may pass, where no answer 444 is received from the recipient 414.

Assuming the call attempt is urgent, a set of proximate devices 446 can be detected. This can involve the recipient device querying 447 one or more devices of bystanders, such as bystander 416. A respond 448 can result from the query 447. In one embodiment, BLUETOOTH or other protocol able to interrogate proximate devices can be used.

Option A shows one contemplated means to contact a proximate bystander 416. According to Option A, the response 448 (received via a PAN) can include contact information (e.g., phone number) for communicating directly with the bystander's device. This contact 452 information can be conveyed from the recipient 414 to the communication system 412 as part of a redirection 450 effort. Once the communication system 412 receives the contact 452 information, it can setup a direct call session 454 between the caller 410 and the bystander 416. The bystander 416 may physically approach the recipient 414 and possibly even permit the recipient 414 to use the bystander's device to participate in the call session 454.

Option B shows another contemplated means to contact a set of bystanders 416, 418. According to Option B, the recipient's communication device can construct a message 460, which details that the caller 410 is attempting to contact the recipient 414. The message 460 can include additional details of the urgency of the contact, which may have been input by the caller 410. The recipient device can convey a set of constructed messages 462, 464 over a PAN to each bystanders' (416, 418) device, assuming each bystander 416, 418 is in PAN range. It can be assumed that upon receiving the messages 462, 464 one of the bystanders 416, 418 will approach recipient 414 upon receiving the message 462, 464.

Option C shows still another contemplated means to contact a set of bystanders 416, 418. In Option C, GPS data 470 can be conveyed from the recipient device to communication system 412. The communication system 412 can determine which devices are proximate to the recipient's device based upon the position determined from the data 470. System 412 can then construct a message 474. System 412 can convey the constructed message 476, 478 to one or more bystanders 416, 418.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for directing communications to a receiving communication device proximate to an impeded communication device comprising:

identifying a communication attempt directed towards a recipient device;

detecting an impediment to the communication attempt, wherein the impediment comprises one of the recipient device being in a concealed state, the recipient device having a muted ringer state, and the recipient devices being powered off;

responsive to detecting the impediment, detecting one or more communication devices proximate to the recipient device, each of the one or more communication devices being able to receive the communication attempt;

accessing a contact list associated with the recipient device;

filtering the detected one or more proximate communication devices using the contact list to ensure only those one or more proximate communication devices that are associated with a contacts of the contact list are conveyed messages relating to the communication attempt;

conveying a digitally encoded message to at least one of the one or more proximate communication devices resulting from the filtering, wherein said digitally encoded message informs a user that receives the message via that user's communication device, wherein that user's communication device is one of the filtered, proximate communication devices, of the communication attempt that was directed towards the recipient device.

2. The method of claim 1, wherein the detected impediment is the recipient device being powered off.

3. The method of claim 1, wherein the conveyed message is at least one of a text message or an instant message.

4. The method of claim 1, further comprising:
the service provider determining a geographic location of the recipient device based upon at least one of GPS data provided by the recipient device, location data provided by a presence server, and location information ascertained by wireless signals conveyed to and from the recipient device and at least one wireless transceiving node having a known fixed geographic location; and
the service provider accessing a presence database accessible by the service provider to determine the proximate one or more communication devices based upon devices in the presence database proximate to the determined geographic location.

5. The method of claim 1, wherein the detected impediment is the recipient device being in the concealed state.

6. The method of claim 1, further comprising, wherein said impediment decreases a likelihood that a user of the recipient device will be successfully notified of the identified communication attempt.

7. The method of claim 1, wherein existence of the impediment is based upon a condition detected by at least one sensor of the recipient device.

8. The method of claim 1, further comprising:
responsive to detecting the impediment, adjusting a behavior characteristic of the recipient device to increase a prominence of a notification issued by the recipient device to a user to inform the user of the communication attempt, wherein the adjusting of the behavior characteristic comprises at least one of:
increasing a ringer volume of the recipient device;
toggling a ring state of the recipient device from non-active to active; and
altering a ring tone of the recipient device.

9. A mobile communication device comprising:
a network transceiver configured to wirelessly communicate with a communication system;
a personal area network transceiver configured to wirelessly communicate with proximate devices;
a memory comprising a contact list, said contact list comprising a plurality of contacts, wherein said computer program product is configured to filter detected proximate devices using the contact list to ensure only those detected proximate devices associated with one of the plurality of contacts are conveyed messages;
a computer program product executed by the mobile communication device configured to detect proximate devices within range of a personal area network associated with the personal area network transceiver and to wirelessly convey digitally encoded messages to at least one of the detected proximate devices via the personal area network, wherein said digitally encoded messages directs a user of the proximate device to inform a user of the recipient device of a communication attempt directed towards the mobile communication device from the communication system; and
a condition detector configured to detect whether an impediment to a communication attempt exists, wherein said computer program product executes only when the condition detector detects an impediment, wherein the impediment comprises one of the recipient device being in a concealed state, the recipient device having a muted ringer state, and the recipient devices being powered off, wherein existence of the impediment is based upon a condition detected by at least one sensor of the recipient device, wherein the sensor is at least one of a light sensor and a motion sensor, wherein said light sensor is used to detect an impediment of the recipient device being concealed, and wherein the motion sensor is used to detected an impediment of the recipient device being located within a moving vehicle.

10. The mobile communication device of claim 9, wherein the communication system is a mobile telephony system, wherein the network transceiver is a mobile telephony transceiver, wherein the personal area network transceiver conforms to a standardized protocol comprising at least one of BLUETOOTH, WIRELESS USB, ZIGBEE, and WIFI, wherein the sensor is the motion sensor, wherein the impediment is that the recipient device is within a moving vehicle, and wherein the proximate device is a sound system of the moving vehicle that audibly presents the digitally encoded message.

11. The mobile communication device of claim 9, wherein said impediment decreases a likelihood that a user of the recipient device will be successfully notified of an incoming communication attempt.

12. A computer program product comprising:
a non-transitory computer usable medium having computer usable program code embodied therewith, the computer usable program code comprising:
computer usable program code configured to identify a communication attempt directed towards a recipient device;
computer usable program code configured to detecting an impediment to the communication attempt, wherein the impediment comprises one of the recipient device being in a concealed state, the recipient device having a muted ringer state, and the recipient devices being powered off;
computer usable program code configured to, responsive to detecting the impediment, detect one or more communication devices proximate to the recipient device, each of the one or more communication devices being able to receive the communication attempt;
computer usable program code configured to accessing a contact list associated with the recipient device;
computer usable program code configured to filter the detected one or more proximate communication devices using the contact list to ensure only those one or more proximate communication devices that are associated with a contacts of the contact list are conveyed messages relating to the communication attempt;
computer usable program code configured to convey a digitally encoded message to at least one of the one or more proximate communication devices resulting from the filtering, wherein said digitally encoded message informs a user that receives the message via that user's communication device, wherein that user's communication device is one of the filtered, proximate communication devices, of the communication attempt that was directed towards the recipient device.

13. An apparatus comprising:
one or more processors;
a non-transitory computer usable medium having computer usable program code embodied therewith, wherein said one or more processors are operable to execute the computer usable code, the computer usable program code comprising:
computer usable program code configured to identify a communication attempt directed towards a recipient device;
computer usable program code configured to detecting an impediment to the communication attempt, wherein the impediment comprises one of the recipient device being in a concealed state, the recipient device having a muted ringer state, and the recipient devices being powered off;

computer usable program code configured to, responsive to detecting the impediment, detect one or more communication devices proximate to the recipient device, each of the one or more communication devices being able to receive the communication attempt;

computer usable program code configured to accessing a contact list associated with the recipient device;

computer usable program code configured to filter the detected one or more proximate communication devices using the contact list to ensure only those one or more proximate communication devices that are associated with a contacts of the contact list are conveyed messages relating to the communication attempt;

computer usable program code configured to convey a digitally encoded message to at least one of the one or more proximate communication devices resulting from the filtering, wherein said digitally encoded message informs a user that receives the message via that user's communication device, wherein that user's communication device is one of the filtered, proximate communication devices, of the communication attempt that was directed towards the recipient device.

\* \* \* \* \*